Feb. 4, 1964     C. S. BARNHART, SR     3,120,075
COLLAPSIBLE MOSQUITO TRAP

Filed Aug. 24, 1962

INVENTOR.
CLYDE S. BARNHART SR.

BY

ATTORNEY

3,120,075
COLLAPSIBLE MOSQUITO TRAP
Clyde S. Barnhart, Sr., Alexandria, Va.
(10 Shamrock Road, Bel Air, Md.)
Filed Aug. 24, 1962, Ser. No. 219,823
3 Claims. (Cl. 43—139)
(Granted under Title 35, U.S. Code (1952), sec. 266)

The invention described herein may be manufactured and used by or for the Government for governmental purposes without the payment to me of any royalty thereon.

The present invention pertains to a collapsible mosquito trap for collecting samples of mosquitoes for the study of population density, and the study of diseases present in the mosquitoes. Heretofore mosquito traps have been used for the reduction of the mosquito population and no precaution was taken to preserve the mosquito in an undamaged condition. If all that is required is that the mosquito population be reduced then it does not matter if the mosquitoes come in contact with a fan blade and are mutilated.

It is the principal object of this invention to provide a mosquito trap that is simple in design and is collapsible for easy storing and transporting.

Another object of this invention is to provide a mosquito trap that will retain a substantial number of the mosquitoes in an unmutilated condition.

Still another object of this invention is to provide a mosquito trap that is adapted to capture mosquitoes and let the larger beetles and flying insects escape.

Figure 1:
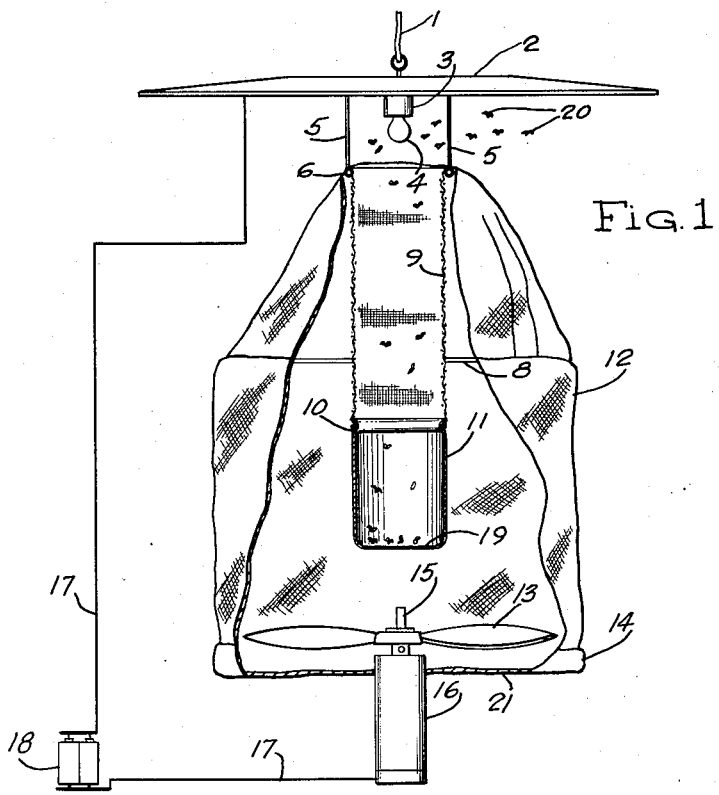
Figure 2:
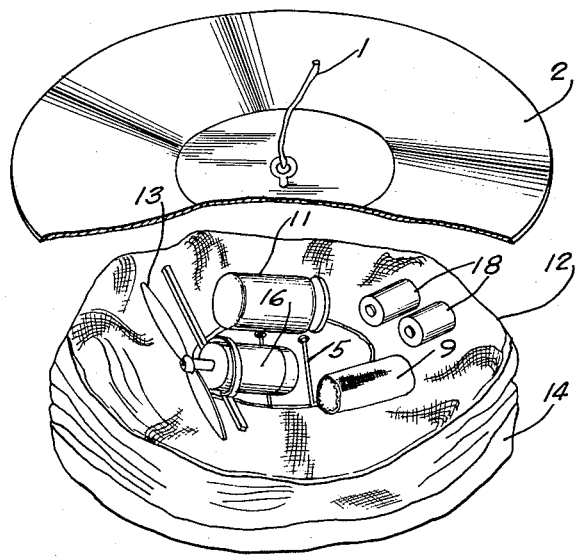

FIG. 1 is an elevational view showing the relative positions of the various components; and FIG. 2 is a view of the mosquito trap showing it in its collapsed condition.

Referring to FIG. 1, the stiff disc 2 of waterproof cardboard is supported by string 1 which can be tied to a tree limb or any convenient place for hanging the mosquito trap. Directly below the supporting string 1 and on the underneath side of the disc 2 is an electric light bulb socket 3. This socket is permanently fastened to the disc at its center. A low current drawing light bulb 4 fits into the socket 3. A series of strings 5 are secured to the underside of disc 2, each at a fixed distance from the light bulb socket 3. These strings are in turn fastened to mouth forming and holding ring 6. Ring 6 is suspended by these strings at a distance below the waterproof disc 2 sufficient to allow a mosquito 20 to fly between the disc and ring 6 when the mosquito is attracted to light 4. Cylindrical pervious netting 9 with the same diameter as ring 6 has its upper opening secured to the ring 6, and its other end hanging down from said ring. At the bottom opening of netting 9 is killing jar 11 with insecticide 19 covering its bottom. Securing the killing jar 11 to the pervious netting 9 is accomplished by a rubber band 10 around the netting and the mouth of jar 11. The netting serves both to filter out the mosquitoes keeping them out of contact with the propeller blade of the fan, and also to support jar 11 above the propeller blade 13.

A waterproof cylindrical chamber 12 is made of a treated fabric or plastic sheathing. The upper opening of chamber 12 is gathered in and fastened to the mouth forming and holding ring 6 along with the top of the pervious netting 9. To prevent the waterproof chamber from draping down next to the pervious netting and cutting off the path of air flowing through it, a body forming and holding ring 8 is fixed to the inside of the chamber, said ring being larger in diameter than the mouth forming and holding ring 6. This larger diameter causes the waterproof chamber or housing to be held away from the netting, providing a passageway for the air to travel to the fan. A metal band 14 is fitted on the lower opening of the chamber 12 and the material of the chamber fastened to it. Band 14 holds the lower part of the waterproof chamber open and also gives a support on which to attach the battery powered motor 16. The motor 16 is held in position directly below the killing jar 11 with a wire 21 strung between opposite sides of band 14 with the motor 16 tied in the middle of said wire. The center of gravity of motor 16 is below the place at which wire 21 is attached to it so that the weight of the motor will always keep the propeller erect and directly below the killing jar 11. Also, this wire allows the motor to be rotated so as to lie on its side when the mosquito trap is collapsed. Propeller 13 which is a conventional model airplane propeller is mounted on shaft 15 of motor 16. Wires 17 connect both the motor 16 and light bulb socket 3 to a battery source 18.

FIG. 2 is a bottom view of the collapsed mosquito trap. Motor 16 and propeller 13 are turned at 90° from their operating position so that the trap can be collapsed into a flat package. Batteries 18 and killing jar 11 are placed beside the motor 16. With killing jar 11 removed the pervious netting 9 and waterproof flexible chamber 12 can be folded between disc 2 and lower supporting band 14.

In operation, the mosquito trap is hung from a convenient place by string 1, and the motor 16 and light 4 turned on. The downdraft created by propeller 13 of motor 16 is strong enough to draw the mosquitoes down into the killing jar 11 when the mosquitoes are attracted to the light, but weak enough to let larger beetles and insects escape before dropping into killing jar 11. The air is drawn in through the opening between disc 2 and ring 6, and then down into the cylindrical pervious netting 9, said air exiting through the pervious netting leaving the trapped mosquitoes on the inside of said cylinder of netting. The mosquitoes then fall into the killing jar without ever coming into contact with propeller blade 13. In this manner the mosquitoes are killed but remain unmutilated and are capable of being used for scientific study.

Collapsing the mosquito trap is accomplished by removing the killing jar, rotating the motor 16 and propeller 13 90° about the axis of the supporting wire 21, and pushing plate 2 down upon the motor 16. Because ring 6 and ring 8 are of different diameters and both the pervious netting 9 and the waterproof exterior housing 12 are flexible, the whole mosquito trap can be folded into a neat and compact package when not in use.

I claim:
1. A collapsible mosquito trap comprising:
   a. a disc,
   b. a light source and holder therefor attached to said disc,
   c. a collapsible waterproof chamber having top and bottom openings and suspended from said disc,
   d. a fan supported across said bottom opening of said waterproof chamber,
   e. a pervious netting cylinder fastened to the top opening of said waterproof chamber and suspended inside said chamber, and
   f. a rigid impervious container supported above said fan by said pervious netting cylinder furnishing a relatively undisturbed killing and storing area for mosquitoes.
2. A collapsible mosquito trap comprising:
   a. a disc,
   b. a light source and holder therefor attached centrally to one side of said disc,
   c. a cylindrical, collapsible chamber having top and bottom openings and suspended at a fixed distance from said disc,

(1) said chamber having two different diameter rings, the smaller of said two rings fastened to the top of said chamber holding the mouth thereof open, and the second and larger ring secured on the inside of said chamber below the mouth opening formed by the smaller ring thereby giving said chamber a small opening at the top and a larger body diameter, (2) said chamber having a metal band about its circumference at the lower end thereof, d. a motor and a propeller driven by said motor, support means for said motor on the bottom of said chamber and fastened to said metal band, e. a pervious netting cylinder suspended from said smaller top ring of said chamber and within said cylindrical netting, and f. a rigid impervious container suspended above said propeller by said net cylinder, said container being attached at its mouth to the bottom opening of said net cylinder and furnishing a relatively undisturbed killing and storage area for mosquitoes.

3. A collapsible mosquito trap comprising:

a. a disc, b. support means fixed to the center of said disc for hanging said mosquito trap, c. an electrical socket attached to one side of said disc and capable of receiving an electric light bulb, d. a cylindrical, collapsible, waterproof chamber suspended at a fixed distance below said disc, e. a first ring secured to the top of said waterproof chamber, said ring forming an opening at the top of said waterproof chamber, f. a second ring larger in diameter than said first ring and secured to the inside of said chamber at a position below the top of said chamber, g. a band fixed to the bottom circumference of said waterproof chamber, h. a propeller and a motor for driving said propeller supported on the bottom of said waterproof chamber and fastened to said band, i. a pervious netting cylinder fastened to said first ring, said cylindrical netting being suspended inside said waterproof chamber, j. a receptacle support means secured to a bottom opening of said net cylinder, and k. a rigid impervious receptacle carried by said support means and containing an insecticide and furnishing a relatively undisturbed killing and storage area for mosquitoes.

References Cited in the file of this patent

UNITED STATES PATENTS

| | | |
|---|---|---|
| 1,819,551 | Gourdon | Aug. 18, 1931 |

FOREIGN PATENTS

| | | |
|---|---|---|
| 618,847 | France | Dec. 21, 1926 |
| 760,355 | France | Dec. 14, 1933 |
| 638,963 | Germany | Nov. 26, 1936 |